US008139038B2

(12) United States Patent
Chueh et al.

(10) Patent No.: US 8,139,038 B2
(45) Date of Patent: Mar. 20, 2012

(54) METHOD FOR DETERMINING PRESSED LOCATION OF TOUCH SCREEN

(75) Inventors: Hsin-Ti Chueh, Taoyuan County (TW); Wen-Yao Cheng, Taoyuan County (TW); Hui-Jan Ko, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 764 days.

(21) Appl. No.: 12/208,345

(22) Filed: Sep. 11, 2008

(65) Prior Publication Data

US 2009/0085887 A1 Apr. 2, 2009

(30) Foreign Application Priority Data

Sep. 29, 2007 (TW) ................................ 96136573 A (51) Int. Cl.
*G06F 3/041* (2006.01)
(52) U.S. Cl. ....................... 345/173; 345/156; 178/18.01
(58) Field of Classification Search .......... 345/156–173; 178/18.01
See application file for complete search history.

(56) References Cited

U.S. PATENT DOCUMENTS

| 5,673,066 | A  | * | 9/1997  | Toda et al. ..................... 345/157 |
| 6,340,979 | B1 | * | 1/2002  | Beaton et al. .................. 715/764 |
| 2002/0070926 | A1 | * | 6/2002  | Kavanagh ...................... 345/173 |
| 2002/0089491 | A1 |   | 7/2002  | Willig |
| 2003/0189552 | A1 | * | 10/2003 | Chuang et al. ................ 345/173 |
| 2003/0206162 | A1 |   | 11/2003 | Roberts |
| 2006/0097991 | A1 | * | 5/2006  | Hotelling et al. ............. 345/173 |
| 2007/0080953 | A1 | * | 4/2007  | Lii ................................. 345/173 |
| 2007/0216657 | A1 |   | 9/2007  | Konicek |
| 2007/0229477 | A1 | * | 10/2007 | Ludwig ......................... 345/173 |
| 2008/0100586 | A1 | * | 5/2008  | Smart ............................ 345/173 |

FOREIGN PATENT DOCUMENTS

| EP | 0229713 | 7/1987 |
| WO | 9928811 | 6/1999 |

OTHER PUBLICATIONS

"Office Action of Taiwan Counterpart Application", issued on Jan. 31, 2011, p. 1-p. 8.

* cited by examiner

*Primary Examiner* — Amare Mengistu
*Assistant Examiner* — Premal Patel
(74) *Attorney, Agent, or Firm* — Jianq Chyun IP Office (57) ABSTRACT

A method for determining pressed locations of a touch screen, suitable for an electronic device having the touch screen, is provided. In the present method, coordinates and pressure values of m samples where the touch screen is pressed are detected. Then, the pressure values of those samples are compared to find n samples with the highest pressure values. Finally, the coordinates of those n samples are averaged for determining the pressed location of the touch screen. Accordingly, the accuracy of determining the pressed location of the touch screen can be increased and the convenience for operating the electronic device is enhanced.

20 Claims, 4 Drawing Sheets

METHOD FOR DETERMINING PRESSED LOCATION OF TOUCH SCREEN

CROSS-REFERENCE TO RELATED APPLICATION

This application claims the priority benefit of Taiwan application serial no. 96136573, filed on Sep. 29, 2007. The entirety of the above-mentioned patent application is hereby incorporated by reference herein and made a part of this specification.

BACKGROUND OF THE INVENTION

1. Field of the Invention

The present invention relates to a method for determining a pressed location. More particularly, the present invention relates to method for determining a pressed location of a touch screen according to pressure values of a plurality of detected samples.

2. Description of Related Art

Operation of a touch screen has such advantages as simple, intuitive compared to a conventional keyboard input. Therefore, there is a general trend of applying the touch screen instead of the keyboard as an input interface for laptops, cell phones and portable multimedia players. Taking a conventional cell phone for example, during operation, a user has to press keys of the cell phone while referring to a display picture on the screen, so as to perform operations such as inputting words or switching menus. If the touch screen is applied to the cell phone, all kinds of options may be easily performed on the screen by touching the screen with a stylus or a finger. Therefore, the touch screen provides a convenient input fashion.

However, as to a portable electronic device requiring design features of lightness, slimness, shortness and smallness, size of the touch screen thereof is limited. Therefore, when a user interface is designed by a manufacture, size of functional options in the menu has to be reduced, so as to display more functional options on the screen. Taking a portable electronic device with a built-in windows operating system as an example, since the windows operating system may support a large amount of functions, the functional options on the user interface of the portable electronic device are relatively close to one another, and therefore such user interface may be a new challenge for those accustomed to touch the screen for operation by fingers.

To be specific, distribution of samples detected by the touch screen may be different due to different touching angles, pressures, and different contact parts between the finger and the screen performed on the screen by users, and therefore a pressed location identified by the portable electronic device always deviates from a desired location, and if the functional options on the screen are too close, a wrong option then may be selected, which may cause an inconvenience in utilization.

SUMMARY OF THE INVENTION

Accordingly, the present invention is directed to a method for determining a pressed location of a touch screen, by which suitable samples are selected to determine the pressed location according to pressure values of a plurality of detected samples, so as to increase the accuracy of determining the pressed location.

To achieve the aforementioned objectives, the present invention provides a method for determining a pressed location of a touch screen, which is applied to an electronic device having a touch screen. The method includes the following steps: a. detecting coordinates and pressure values of m samples where the touch screen is continuously pressed, wherein m is a positive integer; b. comparing the pressure values of the m samples to find n samples with the highest pressure values, wherein n is a positive integer; c. averaging the coordinates of the n samples to obtain a first pressed location of the touch screen.

In an embodiment of the present invention, the aforementioned method further comprises: d. detecting a next sample where the touch screen is pressed, comparing the pressure values of the m continuous samples finally detected to find n samples with the highest pressure values, and averaging the coordinates of the n samples to obtain a second pressed location of the touch screen.

In an embodiment of the present invention, the aforementioned method further comprises: e. repeating the aforementioned step d, and again detecting a next sample where the tough screen is pressed until no more sample may be detected, and finally obtaining a k-th pressed location, wherein k is a positive integer.

In an embodiment of the present invention, the aforementioned method further comprises transmitting the 1-th~k-th locations obtained by calculation to an operating system of the electronic device, and then performing a selection by the operating system according to relative relationships of the obtained locations. Wherein, when a distance between the first location and the k-th location is less than a predetermined value, an object located at the first location or the k-th location is then selected; and when the distance between the first location and the k-th location is greater than the predetermined value, an object located within a scope of selection between the first location and the k-th location is then selected.

In an embodiment of the present invention, the aforementioned step of comparing the pressure values of the m samples to find n samples with the highest pressure values further comprises omitting the 1-th~i-th samples within the detected m samples, and only comparing the pressure values of the (i+1)-th~m-th samples, so as to find n samples with the highest pressure values, wherein i is a positive integer.

In an embodiment of the present invention, the coordinates of the samples comprise horizontal coordinates and vertical coordinates, and the aforementioned electronic device comprises a cell phone, a personal digital assistant, or a notebook computer.

The present invention provides a method for determining a pressed location of a touch screen, which may be applied to an electronic device having the touch screen. The method includes the following steps: a. detecting coordinates and pressure values of m samples where the touch screen is continuously pressed, wherein m is a positive integer; b. comparing the pressure values of the m samples to find n samples with the highest pressure values, wherein n is a positive integer; c. calculating an average value (AVG) and a standard deviation (SD) of the pressure values of the n samples; d. selecting the samples with the pressure values that fall into a scope of (AVG±f×SD) within the m samples, wherein f is a positive integer; e. averaging the coordinates of the selected samples to obtain a first pressed location of the touch screen.

The present invention provides a method for determining a pressed location of a touch screen, which may be applied to an electronic device having the touch screen. The method includes the following steps: a. detecting coordinates and pressure values of m samples where the touch screen is continuously pressed, wherein m is a positive integer; b. selecting the j-th~(m+j−1)-th samples, and comparing the pressure values of the m samples to find n samples with the highest pressure values, wherein j, m and n are positive integers; c. averaging the coordinates of n samples to obtain a first pressed location of the touch screen.

In an embodiment of the present invention, the aforementioned method further comprises: d. selecting the (j+1)-th~(m+j)-th samples, and comparing the pressure values of the m samples to find n samples with the highest pressure values, and then averaging the coordinates of n samples to obtain a second pressed location of the touch screen.

In an embodiment of the present invention, the aforementioned method further comprises: e. repeating the aforementioned step d until the coordinates and the pressure values of all the detected samples are calculated, and obtaining a p-th pressed location.

The present invention provides a method for determining a pressed location of a touch screen, which may be applied to an electronic device having the touch screen. The method includes the following steps: a. detecting coordinates and pressure values of a plurality of samples where the touch screen is continuously pressed; b. selecting the j-th~(m+j−1)-th samples, and comparing the pressure values of the m samples to find n samples with the highest pressure values, wherein j, m and n are positive integers; c. calculating an average value (AVG) and a standard deviation (SD) of the pressure values of the n samples; d. selecting the samples with the pressure values that fall into a scope of (AVG±f×SD), wherein f is a positive integer; e. averaging the coordinates of the selected samples to obtain a first pressed location of the touch screen.

In the present invention, according to the coordinates and the pressure values of the plurality of samples detected by the touch screen, only the samples with the highest pressure values or the suitable samples with the pressure values thereof around the average value are selected for calculating an actual pressed location of the touch screen, so as to increase the accuracy of determining the pressed location.

In order to make the aforementioned and other objects, features and advantages of the present invention comprehensible, a preferred embodiment accompanied with figures is described in detail below.

DESCRIPTION OF EMBODIMENTS

Generally, during determining a pressed location of a touch screen, a plurality of samples is continuously detected within a single time period, and coordinates of the samples are averaged to obtain a determination result. However, in the practical application, distribution of the samples detected by the touch screen may be different due to different touching angles, pressures, and different contact parts between a finger and the screen performed on the screen by users.

By analysing pressing behavior of general users, it is found that a location actually to be selected by the user is generally the location bearing a highest pressure. Therefore, the pressed location may be determined according to the detected pressure values of the samples, by which the obtained pressed location will not be too much deviated from the location actually to be selected by the user. Accordingly, the present invention provides a method for determining a pressed location of a touch screen based on the aforementioned concept. In order to make the aforementioned concept of the present invention comprehensible, preferred embodiments are described in detail below.

Figure 1:
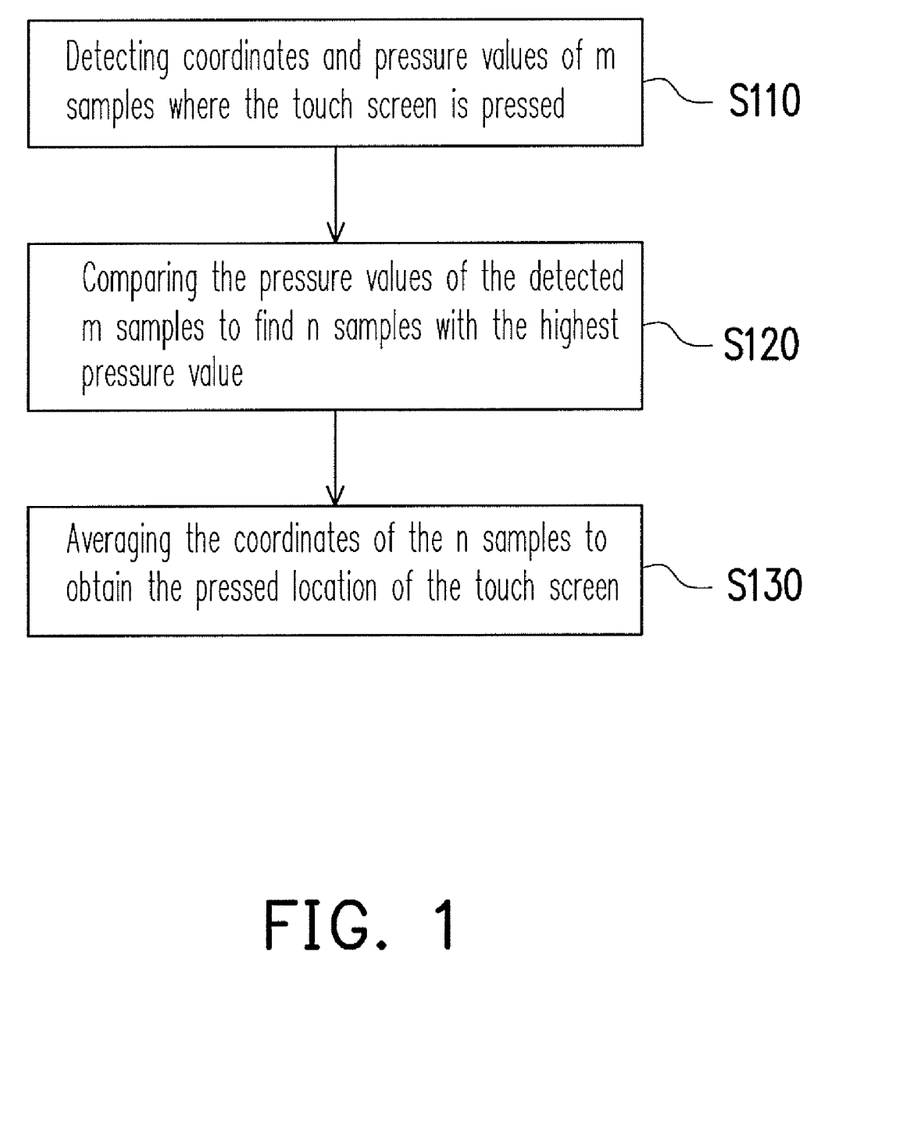
FIG. 1 is a flowchart illustrating a method for determining a pressed location of a touch screen according to an embodiment of the present invention.

FIG. 1 is a flowchart illustrating a method for determining a pressed location of a touch screen according to an embodiment of the present invention. Referring to FIG. 1, the method of the present embodiment may be applied to an electronic device having the touch screen, where the electronic device includes portable electronic devices such as a cell phone, a personal digital assistant and a notebook computer, but is not limited to them. Detailed description of the method will be described as below.

First, in step S110, coordinates and pressure values of m samples where the touch screen is pressed are detected, wherein m is a positive integer. The samples may be touch points with pressure values greater than a predetermined threshold value, detected by the touch screen within a predetermined period of time. Each time when the touch screen detects a sample, the coordinate and the pressure value of the sample are transmitted to a processor of the electronic device, so as to calculate the pressed location.

Next, in step S120, after the electronic device receives the coordinates and the pressure values of the plurality of samples, the pressure values of the detected continuous m samples are then compared, so as to find n samples with the highest pressure values, wherein n is a positive integer, and the coordinates of the samples includes horizontal coordinates and vertical coordinates.

Finally, in step S130, the coordinates of the n samples are averaged to obtain the pressed location of the touch screen. Wherein, since the pressed location is calculated according to several samples with the highest pressure values, not according to an average coordinate of all the samples, influence of human factors such as touching angle, pressure, and contact part between the finger and the screen can be reduced, such that the accuracy of determining the pressed location may be increased.

Also by analysing pressing behavior of general users, it is discovered that the foremost several samples where the touch screen is pressed may be influenced by the factors of touching angle, touching habit etc., and therefore a referential value thereof is not high. Thus, the detected foremost several samples may be omitted during a selection, and only the pressure values of the remained samples are compared to find n samples with the highest pressure values.

For example, table 1 contains the coordinates and pressure values of the samples detected by the touch screen. Wherein, a first row of the table 1 represents a detection sequence of the samples, and X in a second row of the table 1 represents the horizontal coordinate of the sample; Y represents the vertical coordinate of the sample, and P represents a reciprocal of the pressure value, namely, the smaller the P is, the greater the pressure value is. As shown in table 1, locations deviations of the foremost several samples detected by the touch screen are relatively great, and therefore when the samples are selected for comparing the pressure values, the foremost several samples may be omitted for improving the accuracy of determining the pressed location.

TABLE 1

| | Samples | | | | | | | | |
|---|---|---|---|---|---|---|---|---|---|
| | 1 | 2 | 3 | 4 | 5 | 6 | 7 | 8 | 9 |
| Coordinates | X: 864 Y: 3172 | X: 850 Y: 3163 | X: 803 Y: 3145 | X: 804 Y: 3158 | X: 802 Y: 3161 | X: 810 Y: 3167 | X: 810 Y: 3164 | X: 811 Y: 3165 | X: 810 Y: 3162 |
| Pressure values | P: 9616 | P: 6936 | P: 5428 | P: 5201 | P: 4651 | P: 4471 | P: 4203 | P: 4119 | P: 4033 |

| | Samples | | | | | | | | |
|---|---|---|---|---|---|---|---|---|---|
| | 10 | 11 | 12 | 13 | 14 | 15 | 16 | 17 | 18 | |
| Coordinates | X: 811 Y: 3156 | X: 808 Y: 3148 | X: 808 Y: 3145 | X: 809 Y: 3141 | X: 814 Y: 3134 | X: 820 Y: 3133 | X: 829 Y: 3136 | X: 847 Y: 3134 | X: 851 Y: 3083 | |
| Pressure values | P: 4071 | P: 4290 | P: 4476 | P: 4878 | P: 5315 | P: 5945 | P: 6938 | P: 9071 | P: 12654 | |

According to the aforementioned steps, the pressed location of the touch screen may be determined by the electronic device according to the detected continuous m samples. However, the method of the present invention may further include a step of continuously detecting the samples and repeatedly selecting the samples and calculating the pressed locations, so as to provide information to the operating system of the electronic device for analysing pressing behavior of the user for performing the selection. Another embodiment is provided below for detail description.

Figure 2:
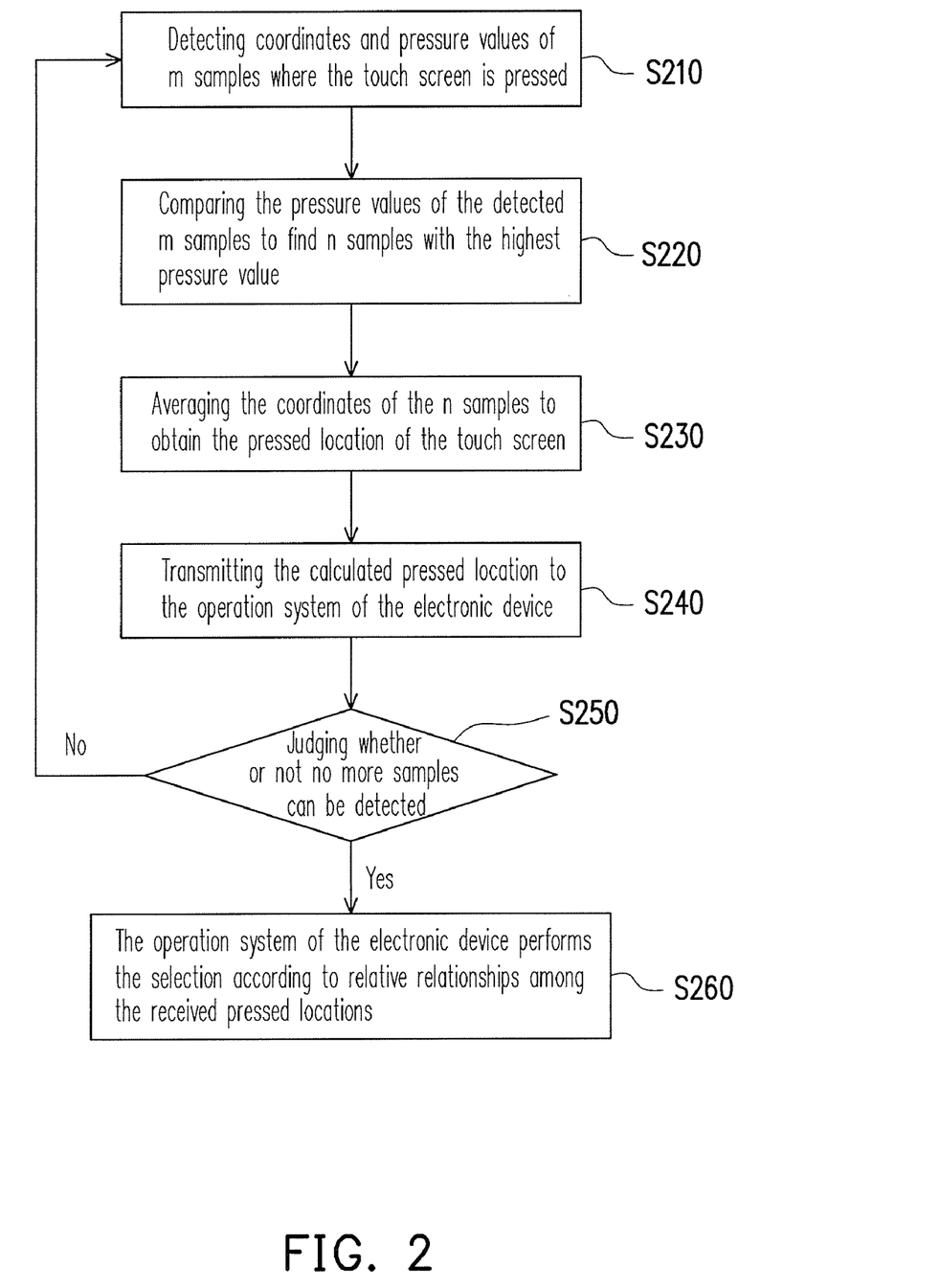
FIG. 2 is a flowchart illustrating a method for determining a pressed location of a touch screen according to another embodiment of the present invention.

FIG. 2 is a flowchart illustrating a method for determining a pressed location of a touch screen according to another embodiment of the present invention. Referring to FIG. 2, the method of the present embodiment may be applied to an electronic device having the touch screen, and the electronic device includes portable electronic devices such as a cell phone, a personal digital assistant and a notebook computer, though the portable electronic devices are not limited thereon. Detailed description of the method will be described as below.

First, in step S210, coordinates and pressure values of m samples where the touch screen is pressed are detected, wherein m is a positive integer. Next, in step S220, after the electronic device receives the coordinates and the pressure values of the m samples, the pressure values of the m samples are then compared to find n samples with the highest pressure values, wherein n is a positive integer. Next, in step S230, the coordinates of the n samples are averaged to obtain the pressed location of the touch screen. The steps S210~S230 are the same or similar to the steps S110~S130 of the aforementioned embodiment, and the detailed description thereof will not be repeated.

When the pressed location is obtained, in step S240, the calculated pressed location is then transmitted to the operating system of the electronic device. Next, in step S250, the electronic device then further judges whether or not no more samples can be detected by the touch screen. This step is necessary since besides a simple pressing, operation actions of the user may also include a towing movement, and during the towing movement, the finger may continuously stay upon the touch screen and slide around.

To effectively detect and judge the operation actions of the user, when the electronic device detects that the touch screen may still detect the samples, the steps S210~S240 are then repeated for continuously detecting the samples, selecting the samples with the highest pressure values, averaging the coordinates of the samples and transmitting an average value to the electronic device. When no more samples is detected by the touch screen, step S260 is then executed, by which the operating system of the electronic device may perform the selection according to relative relationships of the received pressed locations.

It should be noted that in the aforementioned embodiment, each time when one sample is detected, the pressure values of the last m samples are immediately selected and compared for obtaining required location information. However, in another embodiment, the foremost m samples may be selected by the electronic device to calculate a first pressed location after the plurality of samples are continuously detected by the electronic device, and then the k-th~(m+k−1)-th samples are selected for calculating a k-th pressed location. Selection and calculation then may be performed repeatedly until all the detected samples are calculated to obtain the pressed locations. By such means, improvement of the accuracy of determining the pressed location may also be achieved.

Moreover, in the step S260, when the electronic device detects a distance between the first pressed location and a last pressed location is less than a predetermined value, an object located on the pressed locations in the screen is then selected, which is referred as the so called simple pressing action. On the other hand, when the operating system of the electronic device detects the distance between the first pressed location and the last pressed location is greater than the predetermined value, an object located within a scope of selection between the first pressed location and the last pressed location is then selected, which is referred as the so called towing pressing action. However, the aforementioned two pressing actions are for examples only, and have no intention to limit the present invention. Different pressing actions corresponding to different pressed locations may be design by those skilled in the art according to an actual requirement.

Figure 3:
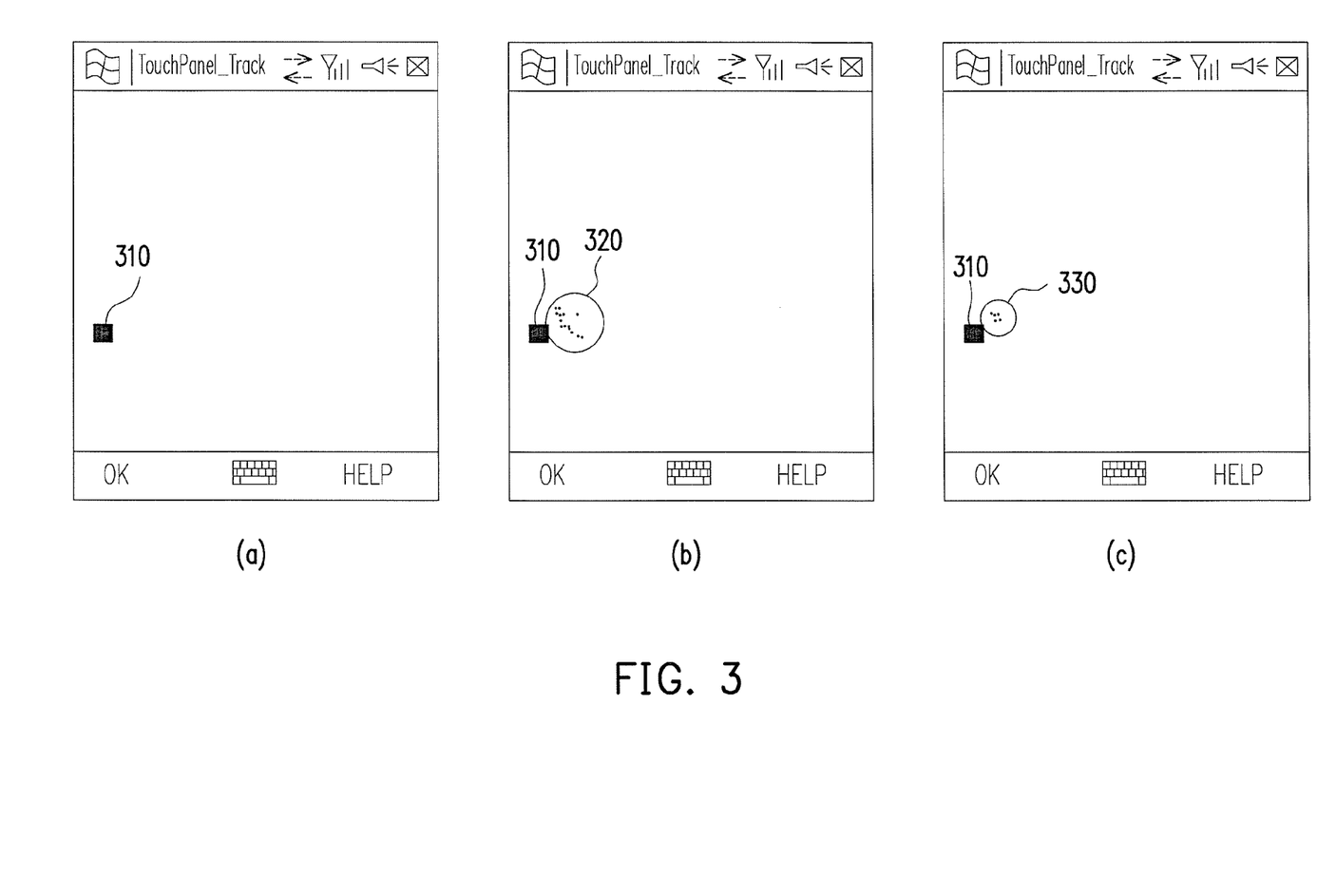
FIG. 3 is a schematic diagram illustrating a method for determining a pressed location of a touch screen according to an embodiment of the present invention.

FIG. 3 is a schematic diagram illustrating a method for determining a pressed location of a touch screen according to an embodiment of the present invention. FIG. 3(a) illustrates a window displayed on the touch screen, wherein a target 310 is assumed to be a target location to be pressed by the user. After the touch screen is pressed by the user, a plurality of samples 320 may be detected by the touch screen, as shown in FIG. 3(b). After the samples 320 are calculated according to the method of the present invention for determining a pressed location of a touch screen, the pressed location transmitted to the operating system is then determined as a determination result 330 shown in FIG. 3(c). By comparing FIG. 3(b) with FIG. 3(c), it is obvious that the present invention may effectively reduce an expansion range of the samples, such that the accuracy of determining the pressed location may be improved.

Another embodiment is provided below for demonstrating an effectiveness of the aforementioned method. Referring to the coordinates and pressure values of the samples shown in table 1, if the pressure values of the foremost first~9th samples are selected for comparison, the three samples with the highest pressure values are respectively the 7th, the 8th and the 9th samples, as shown in a first row of table 2:

TABLE 2

| Pressure values | 1: 9616 | 2: 6936 | 3: 5428 | 4: 5201 | 5: 4651 | 6: 4471 | 7: 4203 | 8: 4119 | 9: 4033 | |
|---|---|---|---|---|---|---|---|---|---|---|
| Pressure values | | 2: 6936 | 3: 5428 | 4: 5201 | 5: 4651 | 6: 4471 | 7: 4203 | 8: 4119 | 9: 4033 | 10: 9616 |

Then, the coordinates of the three samples are averaged to obtain the pressed location of the touch screen as follows:

$$P_1(x,y)=[(810,3164)+(811,3165)+(810,3162)]/3=(810, 3163)$$

Next, when the 10th sample is detected, the last 9 samples are selected for comparison, and the 8th, the 9th and the 10th samples with the highest pressure values are then obtained (shown as a second row of table 2). Next, the coordinates of the three samples are averaged to obtain the pressed location of the touch screen as follows:

$$P_2(x,y)=[(811,31165)+(8110,3162)+(811,3156)]/3= (811,3161)$$

Deduced by analogy, the last detected 9 sample may be repeatedly selected for calculating the pressed location while detecting the samples, until no more samples can be detected by the touch screen. Table 3 contains the pressed locations transmitted to the operating system of the electronic device. In a conventional method, the coordinates of 6 samples are selected for calculating the average, while in the method of the present invention, coordinates of 3 samples with the highest pressure values selected from 9 samples are used for calculating the average. According to the table 3, for a coordinate range of the conventional method, 23 pixels are expanded along an X axis, and 35 pixels are expanded along a Y axis; while for the coordinate range of the method of the present invention, only 3 pixels are expanded along the X axis, and only 14 pixels are expanded along the Y axis, which means the method of the present invention is more accurate than the conventional method.

TABLE 3

| Sequence | Method of the present invention | Conventional method |
|---|---|---|
| 6 | N/A | (822, 3161) |
| 7 | N/A | (813, 3160) |
| 8 | N/A | (806, 3160) |
| 9 | (810, 3163) | (807, 3163) |
| 10 | (811, 3161) | (809, 3163) |
| 11 | (811, 3161) | (810, 3160) |
| 12 | (811, 3161) | (810, 3157) |
| 13 | (811, 3161) | (810, 3153) |
| 14 | (811, 3161) | (810, 3148) |
| 15 | (811, 3161) | (812, 3143) |
| 16 | (811, 3161) | (815, 3140) |
| 17 | (810, 3155) | (821, 3137) |
| 18 | (809, 3150) | (828, 3127) |

Besides the aforementioned method by which the samples with the highest pressure values are selected for calculating the pressed location, the method of the present invention further includes calculating an average value and a standard deviation of the pressure values of the plurality of continuous samples for using as a basis during selection of the samples. Yet another embodiment is provided below for detail description.

Figure 4:
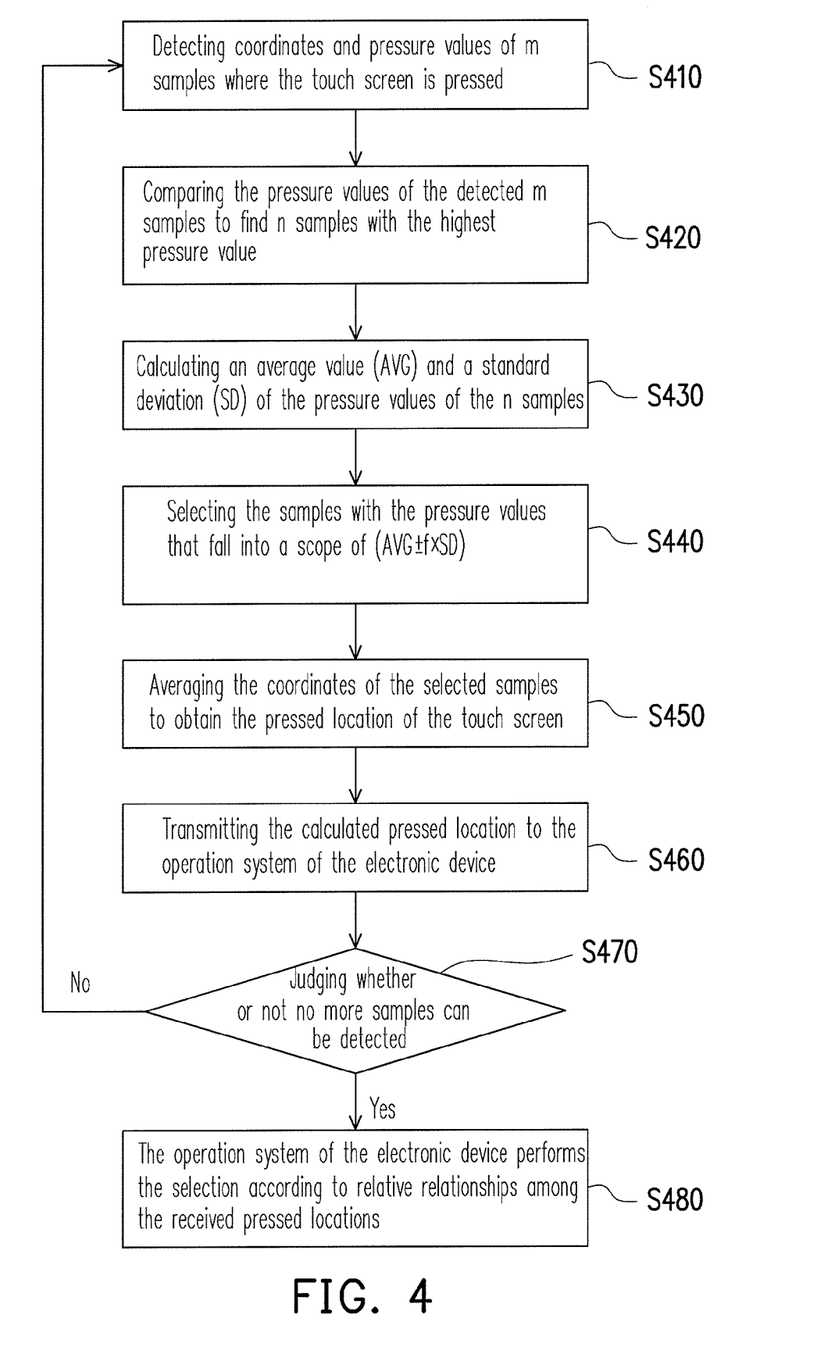
FIG. 4 is flowchart illustrating a method for determining a pressed location of a touch screen according to yet another embodiment of the present invention.

FIG. 4 is flowchart illustrating a method for determining a pressed location of a touch screen according to yet another embodiment of the present invention. Referring to FIG. 4, the method of the present embodiment may be applied to an electronic device having the touch screen, and the electronic device includes portable electronic devices such as a cell phone, a personal digital assistant and a notebook computer, though the portable electronic devices are not limited thereon. Detailed description of the method will be described as below.

First, in step S410, coordinates and pressure values of the plurality of the samples where the touch screen is pressed are detected. Next, in step S420, after the electronic device receives the coordinates and the pressure values of the samples, the pressure values of the detected continuous m samples are then compared, so as to find n samples with the highest pressure values, wherein m and n are positive integers. The steps S410~S420 are the same or similar to the steps S310~S320 of the aforementioned embodiment, and therefore the detailed description thereof will not be repeated.

However, the difference is that step S430 of the present embodiment further includes calculating an average value (AVG) and a standard deviation (SD) of the pressure values of the n samples, and in step S440, the samples with the pressure values that fall into a scope of (AVG±f×SD) are selected. The intention of the step of selecting the samples according to the average value and the standard deviation of the pressure values is to avoid a deviation of the highest pressure values from the location to be selected by the user, occurred due to different contact parts between the finger and the screen (for example fingernail contacts first), or different contact sequence between the finger and the screen (for example, fingertip contacts first, and finger pad contacts behind). Such problems may be solved by selecting the samples according to the average pressure value and the standard deviation of the samples.

After the samples are selected according to the average value and the standard deviation of the pressure values of the samples, in step S450, the coordinates of the selected samples then may be averaged to obtain the pressed location of the touch screen.

The following steps are similar to the steps of the aforementioned embodiment. In step S460, the calculated pressed location is transmitted to the operating system of the electronic device. In step S470, the electronic device further judges whether or not no more samples can be detected by the touch screen, and if the touch screen may still detect the samples, the process is returned to the step S410, and the steps S410~S460 are then repeated for continually detecting the samples, selecting the samples, averaging the coordinates of the samples and transmitting the average value to the electronic device. When no more samples is detected by the touch screen, step S480 is then executed, by which the operating system of the electronic device may perform the selection according to relative relationships of the received pressed locations.

It should be noted that according to the aforementioned embodiment, m samples are gradually selected from the detected samples for finding the samples with the highest pressure values and calculating the average value and the standard deviation thereof, so as to select the samples for calculating the pressed location of the touch screen. However, in another embodiment, while the m samples are detected, the samples with the highest pressure values may be determined in advance and the average value and the standard deviation thereof may be calculated, so as to select the samples for calculating the pressed location of the touch screen. After that, each time when one sample is detected, a new location may be repeatedly calculated, so as to obtain the information of the pressed location instantly.

In addition, in the aforementioned step S420, though the n samples with the highest pressure values are determined according to the pressure values of the detected continuous m samples, if the aforementioned deviation of the highest pressure values may be avoided, the m samples with the highest pressure values may be directly selected (i.e. n=m), namely, all the samples may be applied to calculate the average value and the standard deviation, which can then be used as a basis for selecting the samples.

In summary, in the method for determining a pressed location of a touch screen, with reference of the pressure values of the detected samples, only the samples with the highest pressure values or the samples with the pressure values around the average value are selected for calculating the pressed location of the touch screen, so as to increase the accuracy of determining the pressed location.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for determining a pressed location of a touch screen, used for an electronic device having the touch screen, the method comprising:
   a. detecting coordinates and pressure values of a plurality of m samples where the touch screen is continuously pressed, wherein m is a positive integer;
   b. comparing the pressure values of the m samples to find n samples with the highest pressure values, wherein n is a positive integer; and
   c. averaging the coordinates of the n samples to obtain a first pressed location of the touch screen.

2. The method for determining a pressed location of a touch screen as claimed in claim 1 further comprising:
   d. continuously detecting a next pressed sample, and comparing the pressure values of final detected continuous m samples to find n samples with the highest pressure values, and averaging the coordinates of the n samples to obtain a second pressed location of the touch screen.

3. The method for determining a pressed location of a touch screen as claimed in claim 2 further comprising:
   e. repeating the step d, for continuously detecting a next pressed sample until no more samples can be detected, and finally obtaining a k-th location, wherein k is a positive integer.

4. The method for determining a pressed location of a touch screen as claimed in claim 3 further comprising:

transmitting the obtained first~k-th locations to an operating system of the electronic device.

5. The method for determining a pressed location of a touch screen as claimed in claim 4, wherein after the step of transmitting the obtained first~k-th locations to the operating system of the electronic device, the method further comprises:
   performing a selection by the operating system of the electronic device according to relative relationships of the first~k-th locations.

6. The method for determining a pressed location of a touch screen as claimed in claim 5, wherein the step of performing a selection by the operating system of the electronic device according to relative relationships of the first~k-th locations comprises:
   selecting an object located at the first location or located at the k-th location when a distance between the first location and the k-th location is less than a predetermined value.

7. The method for determining a pressed location of a touch screen as claimed in claim 5, wherein the step of performing a selection by the operating system of the electronic device according to relative relationships of the first~k-th locations comprises:
   selecting an object located within a selection range between the first location and the k-th location when a distance between the first location and the k-th location is greater than the predetermined value.

8. The method for determining a pressed location of a touch screen as claimed in claim 1, wherein the step of comparing the pressure values of the m samples to find the n samples with the highest pressure values further comprises:
   omitting the first~i-th samples within the detected m samples, and only comparing the (i+1)-th~m-th samples to find the n samples with the highest pressure values, wherein i is a positive integer.

9. The method for determining a pressed location of a touch screen as claimed in claim 1, wherein the coordinates of the samples comprises horizontal coordinates and vertical coordinates.

10. The method for determining a pressed location of a touch screen as claimed in claim 1, wherein the electronic device comprises a cell phone, a personal digital assistant or a notebook computer.

11. A method for determining a pressed location of a touch screen, used for an electronic device having the touch screen, the method comprising:
   a. detecting coordinates and pressure values of a plurality of samples where the touch screen is pressed;
   b. selecting j-th~(m+j−1)-th samples within the detected samples wherein m is greater than 1, and comparing the pressure values of the m samples to find n samples with the highest pressure values, wherein j, m and n are positive integers; and
   c. averaging the coordinates of the n samples to obtain a first pressed location of the touch screen.

12. The method for determining a pressed location of a touch screen as claimed in claim 11, further comprising:
   d. selecting the (j+1)-th~(m+j)-th samples within the detected samples, and comparing the pressure values of the m samples to find n samples with the highest pressure values, and averaging the coordinates of the n samples to obtain a second pressed location of the touch screen.

13. The method for determining a pressed location of a touch screen as claimed in claim 12 further comprising:
   e. repeating the step d, until the coordinates and the pressure values of all the detected samples are calculated and a p-th location is obtained.

14. The method for determining a pressed location of a touch screen as claimed in claim 13 further comprising:
  transmitting the obtained first~p-th locations to an operating system of the electronic device.

15. The method for determining a pressed location of a touch screen as claimed in claim 14, wherein after the step of transmitting the obtained first~p-th locations to the operating system of the electronic device, the method further comprises:
  performing a selection by the operating system of the electronic device according to relative relationships of the first~p-th locations.

16. The method for determining a pressed location of a touch screen as claimed in claim 15, wherein the step of performing a selection by the operating system of the electronic device according to relative relationships of the first~p-th locations comprises:
  selecting an object located at the first location or located at the p-th location when a distance between the first location and the p-th location is less than a predetermined value.

17. The method for determining a pressed location of a touch screen as claimed in claim 15, wherein the step of performing a selection by the operating system of the electronic device according to relative relationships of the first~p-th locations comprises:
  selecting an object located within a selection range between the first location and the p-th location when a distance between the first location and the p-th location is greater than the predetermined value.

18. The method for determining a pressed location of a touch screen as claimed in claim 11, wherein the coordinates of the samples comprises horizontal coordinates and vertical coordinates.

19. The method for determining a pressed location of a touch screen as claimed in claim 11, wherein the electronic device comprises a cell phone, a personal digital assistant or a notebook computer.

20. A method for determining a pressed location of a touch screen, used for an electronic device having the touch screen, the method comprising:
  a. detecting coordinates and pressure values of m samples where the touch screen is continuously pressed;
  b. selecting the j-th~(m+j−1)-th samples within the detected samples, and comparing the pressure values of the m samples to find n samples with the highest pressure values, wherein j, m and n are positive integers;
  c. calculating an average value (AVG) and a standard deviation (SD) of the pressure values of the n samples;
  d. selecting samples with the pressure values that fall into a scope of (AVG±f×SD), wherein f is a positive integer; and
  e. averaging coordinates of the selected samples for obtaining a first pressed location of the touch screen.

* * * * *